United States Patent
Duan et al.

(10) Patent No.: US 6,441,952 B1
(45) Date of Patent: Aug. 27, 2002

(54) APPARATUS AND METHOD FOR CHANNEL MONITORING IN A HYBRID DISTRIBUTED RAMAN/EDFA OPTICAL AMPLIFIER

(75) Inventors: Xiaodong Duan; Guohua Xiao, both of Plano; Lintao Zhang, Richardson; Dongqi Liu, Dallas; Gang Li, Richardson; Paul Hull, Carrollton; Charles Xiaoping Mao, Plano, all of TX (US); Simon Xiaofan Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/898,244

(22) Filed: Jul. 3, 2001

(51) Int. Cl.[7] .................................................. H01S 3/00
(52) U.S. Cl. ...................... 359/334; 359/337; 359/341.4
(58) Field of Search ............................... 354/334, 341.4, 354/337

(56) References Cited

U.S. PATENT DOCUMENTS 6,178,038 B1 * 1/2001 Taylor et al. ................ 359/341
6,292,288 B1 * 9/2001 Akasaka et al. ............ 359/334

* cited by examiner

*Primary Examiner*—Mark Hellner
(74) *Attorney, Agent, or Firm*—Sawyer Law Group LLP

(57) ABSTRACT

The present invention provides a hybrid Raman/EDFA optical amplifier that utilizes a first optical detector that generates a first electrical or electronic signal that is proportional the combined optical power of the signal light and the leaked pump laser light, a second optical detector that generates a second electrical or electronic signal that is proportional to the power of the pump laser light and an electronic subtraction circuit that receives the first and second electrical or electronic signals and generates a difference signal that is proportional to only to the optical power of the signal light and insensitive to the power of the Raman pump laser light. The difference signal is utilized by an EDFA control circuit to control and/or adjust the operation of the EDFA based upon changes in the power of the input optical signal.

2 Claims, 4 Drawing Sheets

APPARATUS AND METHOD FOR CHANNEL MONITORING IN A HYBRID DISTRIBUTED RAMAN/EDFA OPTICAL AMPLIFIER

FIELD OF THE INVENTION

The present invention relates to optical amplifiers utilized to amplify optical signals transmitted within optical communications systems. More particularly, the present invention relates to a hybrid optical amplifier comprising a distributed Raman amplifier optically coupled in series to an Erbium-Doped Fiber Amplifier.

BACKGROUND OF THE INVENTION

Raman amplifiers are being increasingly utilized in tandem with Erbium-Doped Fiber Amplifiers (EDFAs) within optical communications systems. It is known that such a hybrid Raman/EDFA system can provide improved signal-to-noise characteristics over simple EDFA's used alone. These improved signal-to-noise characteristics can permit either the utilization of increased span lengths between amplifiers or else the operation of receivers at reduced optical power levels. For instance, when utilized in a system comprising common SMF fiber, the use of a Raman amplifier in conjunction with an EDFA can improve receiver sensitivity by approximately seven dB.

A typical hybrid Raman/EDFA amplifier apparatus 100 is shown in FIG. 1. The backward-propagating light of at least one Raman pump laser 107 amplifies the input optical signal along the transmission fiber 106 with a very low effective noise figure, which can be zero or even negative. A Wavelength Division Multiplexer (WDM) coupler 102, which can, for instance, be based upon fiber-coupler, thin-film filter or other conventional WDM technology, is used to combine the optical signal and the Raman pump laser light. The Raman pump laser light is inserted into the optical system through the P-port of the WDM coupler 102 and is directed to the input fiber 106 from the C-Port of the WDM coupler 102. Concurrently, an optical signal is directed to the C-Port of the WDM coupler 102 through the transmission fiber 106. The backward propagating Raman pump laser light provides Raman amplification to the signal along the length of fiber 106 which acts as pre-amplification for the EDFA 104. The signal then exits the WDM coupler 102 from the R-Port, from which it is directed, through optical coupling 108, to an EDFA 104 for further amplification. The amplified signal is then output to an output fiber 110.

Typically, multiple pump lasers are employed in a conventional hybrid Raman/EDFA system. The lights from the various pump lasers may comprise different polarization, so as to compensate for polarization dependent Raman gain in the input fiber 106 or may comprise different pump wavelengths, so as to broaden and flatten the Raman gain in the input fiber 106. Although the example illustrated in FIG. 1 shows two Raman pump lasers 107, typically six to eight such pump lasers are utilized. The lights of the plurality of pump lasers 107 are combined by at least one pump combiner 109. The pump combiner 109 may comprise one or more simple optical couplers such as fused fiber couplers or beam splitters used in the reverse sense, and/or one or more polarization combiner elements and/or WDM filters.

FIG. 2 illustrates a conventional structure of a WDM 102 for combining the Raman pump laser light together with the signal. Nominally, all the Raman pump laser light is directed from the WDM coupler 102 into the transmission fiber 106 so as to propagate in a reverse direction to the optical signal. However, since the combined pump laser power from multiple pump lasers could be as high as 30 dBm, there can be considerable leaked Raman pump light at the R-port of the WDM coupler. Although some available WDM couplers can achieve optical isolation that is as high as 50 dB between the P-port and the R-port, the leak pump power may still be comparable to the signal power.

Usually, the wavelength of the leaked Raman pump laser is shorter than the signal band and, thus, will not be amplified by EDFA. Eventually, the leaked Raman pump laser light will be filtered out from subsequent optical components before it reaches a receiver, so a small amount of leaked Raman pump laser light is harmless for data transmission. Nonetheless, the leaked Raman pump laser light can cause problems for input power monitoring of EDFA 104 when the leaked pump power is comparable to the signal power. The input power monitoring of the EDFA is essential for the a variety of necessary functions such as automatic gain control, automatic channel number recognition, etc. Conventionally, the power of the leaked Raman pump laser light is reduced by inserting a pump wavelength filter 112 between the R-port and the EDFA 104. Unfortunately, the use of the filter 112 also caused undesirable reduction of the signal power due to the insertion loss of the filter, thereby negating some of the advantages of using Raman pre-amplification.

Accordingly, there exists a need for an improved apparatus and method for channel monitoring in a hybrid Raman/EDFA optical amplifier. The apparatus and method should address the above-mentioned problems without significant insertion loss penalty.

SUMMARY OF THE INVENTION

To address the above-mentioned problem related to leaked Raman pump laser light, the present invention provides a hybrid Raman/EDFA optical amplifier that utilizes a first optical detector that generates a first electrical or electronic signal that is proportional the combined optical power of the signal light and the leaked pump laser light, a second optical detector that generates a second electrical or electronic signal that is proportional to the power of the pump laser light and an electronic subtraction circuit that receives the first and second electrical or electronic signals and generates a difference signal that is proportional to only to the optical power of the signal light and insensitive to the power of the Raman pump laser light. The difference signal is utilized by an EDFA control circuit to control and/or adjust the operation of the EDFA based upon changes in the power of the input optical signal.

An exemplary embodiment of a hybrid Raman/EDFA optical amplifier apparatus in accordance with the present invention comprises: an Erbium-Doped Fiber Amplifier (EDFA), an output fiber optically coupled to an output of the EDFA, a Wavelength Division Multiplexer (WDM) coupler optically coupled to the input of the EDFA and outputting an optical signal to the EDFA, an input fiber optically coupled to the WDM for inputting the optical signal to the WDM and for receiving a Raman pump laser light from the WDM, a first optical tap optically coupled between the EDFA and the WDM, a first monitor detector optically coupled to the first optical tap, an electronic amplifier electrically coupled to the first monitor detector, at least one Raman pump laser optically coupled to the WDM emitting the Raman pump laser light, a second optical tap optically coupled between the Raman pump laser and the WDM, a second monitor detector optically coupled to the second optical tap, an electronic subtract circuit electrically coupled to the second monitor detector and the electronic amplifier and an EDFA control circuit electrically coupled to the electronic subtract circuit and to the EDFA.

The electronic subtract circuit receives an amplified form of the first electrical or electronic signal from the electronic amplifier, receives the second electrical or electronic signal from the second monitor detector and outputs a signal to the EDFA control circuit that is the difference between the two electrical or electronic signals. This difference signal is proportional only to the power of the optical signal. The EDFA control circuit adjusts the operation of the EDFA based upon the optical signal power determined from the difference signal.

The optical amplifier of the present invention is robust against pump laser power fluctuations and adjustments and provides input signal power or channel count monitoring without significant insertion loss penalty.

DETAILED DESCRIPTION

The present invention provides an improved apparatus and method for channel monitoring in a hybrid Raman/EDFA optical amplifier. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 3 and 4 in conjunction with the discussion below.

Figure 1:
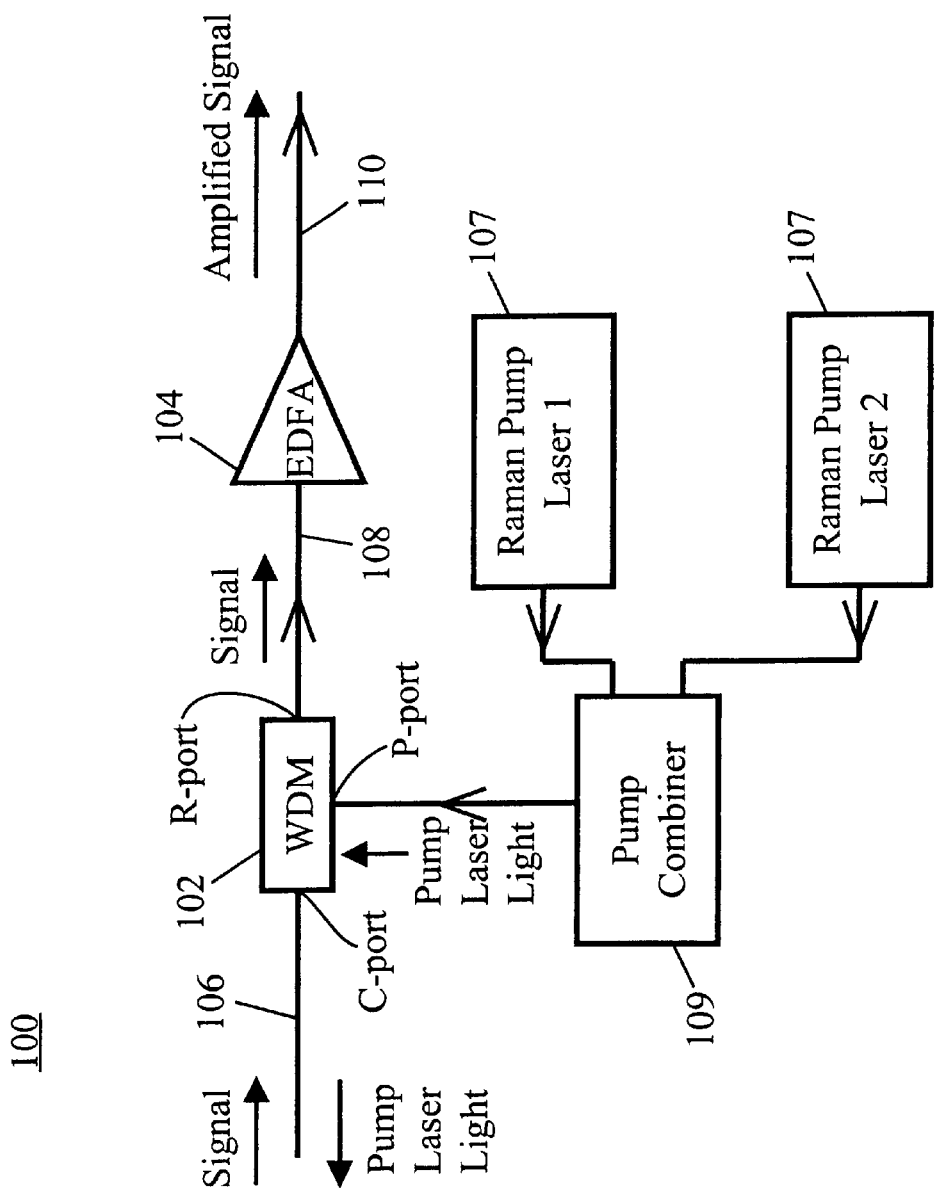
FIG. 1 is a schematic illustration of a prior-art Raman/EDFA hybrid amplifier
Figure 2:
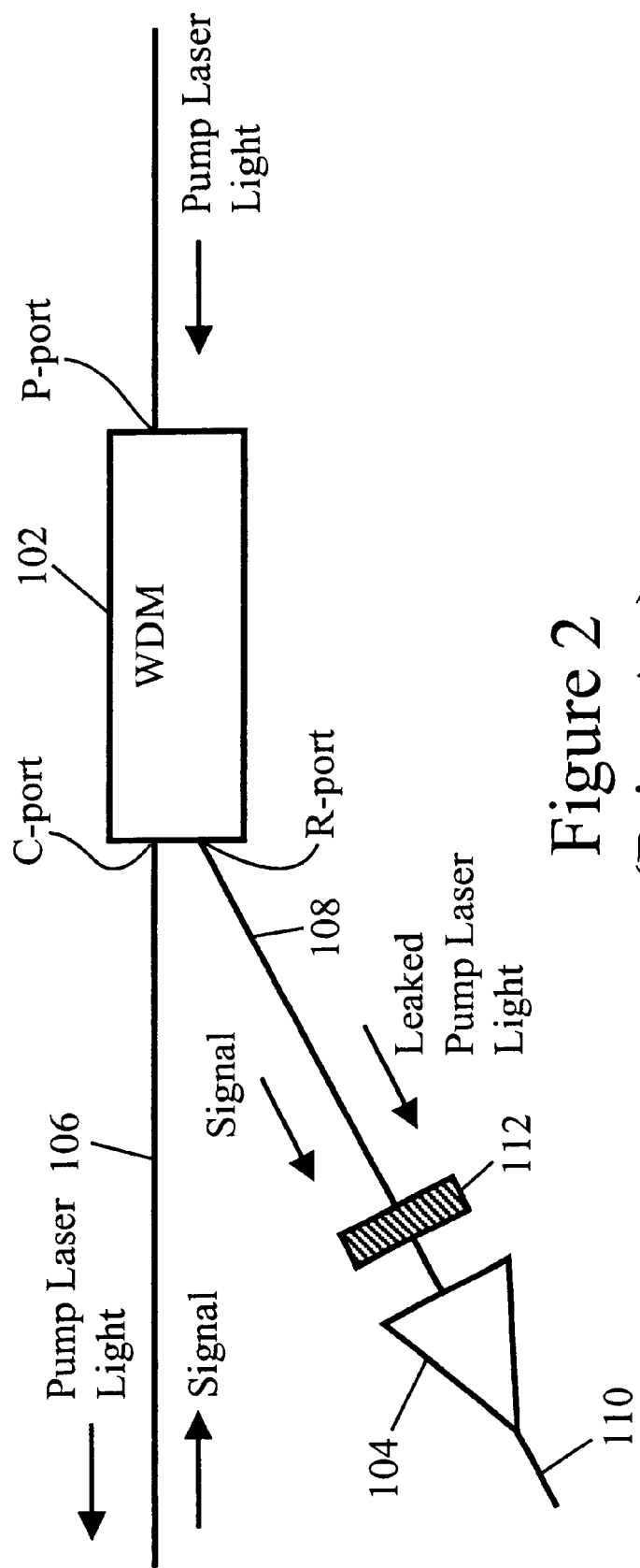
FIG. 2 is an illustration of a prior-art WDM Pump-Signal Combiner for a Raman/EDFA Hybrid amplifier.
Figure 3:
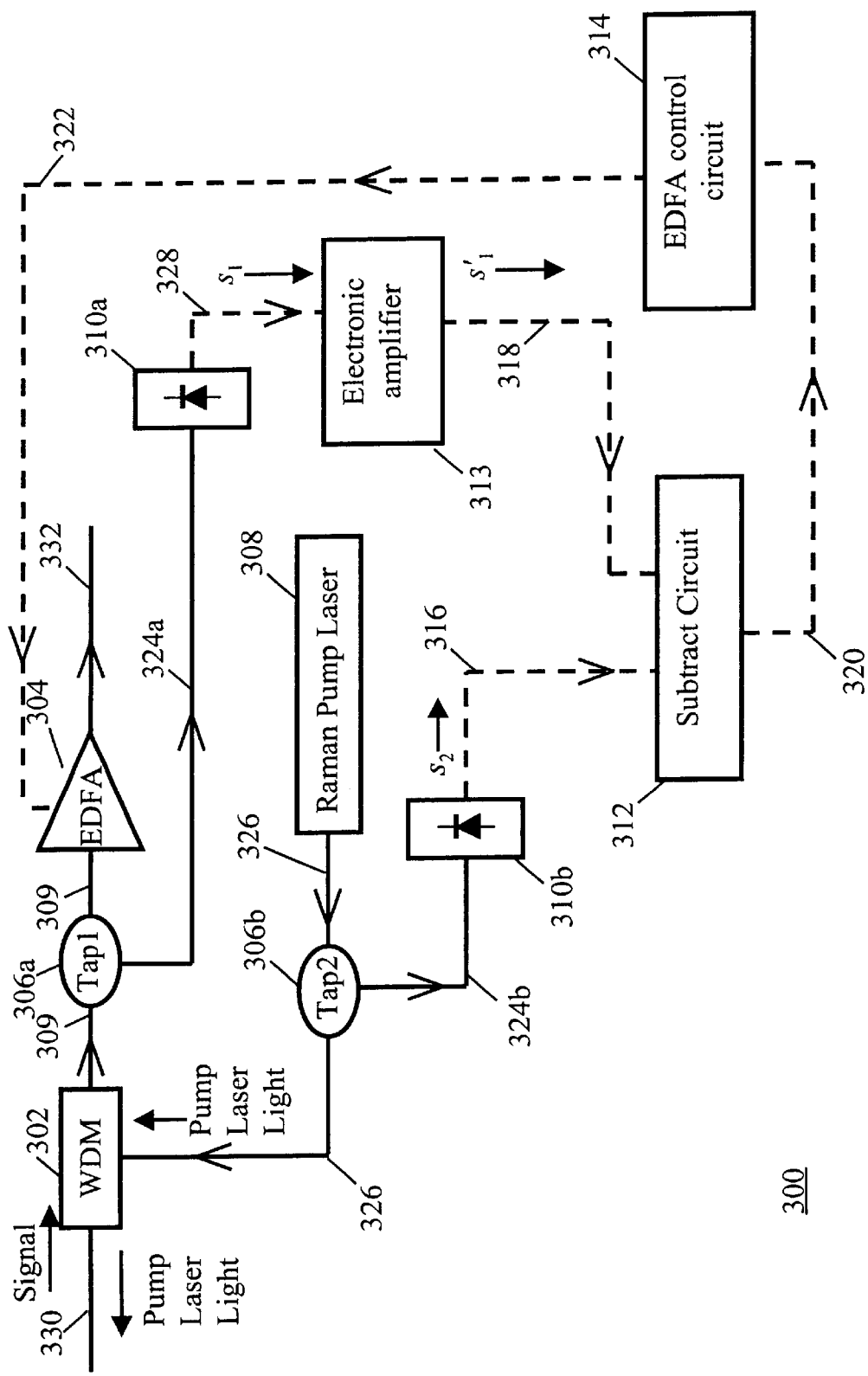
FIG. 3 is a schematic illustration of a first preferred embodiment of an apparatus in accordance with the present invention, comprising an electronic suppression mechanism for eliminating the effects of leaked pump laser signal light.

FIG. 3 is a schematic illustration of a first preferred embodiment of a hybrid Raman/EDFA amplifier apparatus 300 in accordance with the present invention. Solid lines and dashed lines in FIG. 3 represent optical pathways and electrical signal pathways, respectively. In the apparatus 300, a Raman pump laser 308 directs Raman pump laser light to the WDM coupler 302 along optical coupling 326. The pump laser light is directed from the WDM coupler 302 to an input optical fiber 330, wherein it propagates in an opposite direction to an optical signal so as to amplify the signal by Raman amplification. The Raman-amplified optical signal is directed from the input fiber optic line 330 to the WDM coupler 302 and from the WDM coupler 302 to the EDFA 304 along the optical coupling 309. Preferably, the optical couplings 309 and 326 each comprise one or more optical fibers but may comprise bulk optical or micro-optical components, either in whole or in part.

The apparatus 300 (FIG. 3) further comprises a first optical tap (Tap1) 306a and a second optical tap (Tap2) 306b disposed along the optical coupling 326 and along the optical coupling 309, respectively. The optical tap 306b directs a small sampled proportion of the pump laser light to a tap monitor detector 310b along tap line 324b. The optical tap 306a directs a small sampled proportion of the signal light and leaked pump laser light to a tap monitor detector 310a along tap line 324a. Each of the tap monitor detectors 310a–310b comprises any conventional photo-detector, such as a photodiode.

The output, $s_1$, of the tap monitor detector 310a is carried along electrical coupling 328 to the electronic amplifier 313 where it is amplified. The output, $s'_1$, of electronic amplifier 313 is given by the relationship $$s'_1 = g_e s_1 \qquad \text{Eqn. 1}$$

wherein $g_e$ is the adjustable electronic amplifier gain. The electrical or electronic signals $s'_1$ and $s_2$, wherein $s_2$ is the output of the tap monitor detector 310b, are both input to the subtract circuit 312 through electrical couplings 318 and 316, respectively. As described in the following, the output of the subtract circuit 312 can be made proportional to the power of the optical signal reaching the EDFA 304, independent of variations in the pump laser power. This output of the subtract circuit is then delivered to an EDFA control circuit 314 along electrical coupling 320. The EDFA control circuit 314 adjusts the operation of the EDFA 304 via a signal delivered to the EDFA 304 along electrical coupling 322. Most commonly, such EDFA operational adjustment consists of controlling the gain of the EDFA in response to changing optical power of the input signal.

The electrical or electronic signal, $s_2$, produced by the tap monitor detector 310b is proportional to the optical power, $P_{pump}$, of the Raman pump laser light emitted by the Raman pump laser 308, through the equation $$s_2 = c_2 P_{pump} \qquad \text{Eqn. 2}$$

wherein $c_2$ is a calibration constant incorporating the fraction of light diverted by optical tap 306b to tap monitor detector 310b and the sensitivity of the tap monitor detector 310b. Likewise, the electrical or electronic signal, $s_1$, produced by the tap monitor detector 310a is proportional to the sum of the optical power of the signal, $P_{signal}$, and the leaked pump laser light, $P_{leak}$, through the equation $$s_1 = c_1(P_{signal} + P_{leak}) \qquad \text{Eqn. 3}$$

wherein $c_1$ is a calibration constant incorporating the fraction of light diverted by optical tap 306a to tap monitor detector 310a and the sensitivity of the tap monitor detector 310a. Also, $P_{leak}$ is proportional to $P_{pump}$ through the equation $$P_{leak} = f_k P_{pump} \qquad \text{Eqn. 4}$$

wherein $f_k$ is the leaked fraction. Since $P_{leak}$ is proportional to the $P_{pump}$, one can adjust the gain of the electronic amplifier 313 such that $s'_1 = s_2$ in the absence of any signal. Such adjustment causes the variable gain $g_e$ to assume a value $g^o_e$ such that $$c_2 = c_1 g^o_e f_k \qquad \text{Eqn. 5}$$

Thereafter, when the signal is on, the difference between the two electronic signals $s'_1$ and $s_2$ delivered to the subtract circuit 312 is proportional to the power of the optical signal, since $$s'_1 - s_2 = [c_1 g_e^o (P_{signal} + P_{leak})] - c_2 P_{pump} \quad \text{Eqn. 6}$$
$$= c_1 g_e^o P_{signal} + c_1 g_e^o f_k P_{Pump} - c_2 P_{pump}$$
$$= c_1 g_e^o P_{signal} + c_2 P_{Pump} - c_2 P_{pump}$$
$$= c_1 g_e^o P_{signal}$$

This output of the subtract circuit can be used for monitoring the optical power of the optical signal input to the EDFA, since it is insensitive to $P_{pump}$. Since the powers of the pump laser light and the leaked pump laser light are correlated, such a design is robust against pump laser power fluctuations and adjustments. The leakage pump signal can be effectively reduced 20 dB by this electronic cancellation design.

Most generally, the power of the input optical signal will fluctuate significantly when the number of information channels comprising a Wavelength Division Multiplexed optical signal changes as a result of channel adding and dropping within an optical communications system or network. Thus, the optical power monitoring capabilities provided by the present invention may also be utilized for channel monitoring.

Figure 4:
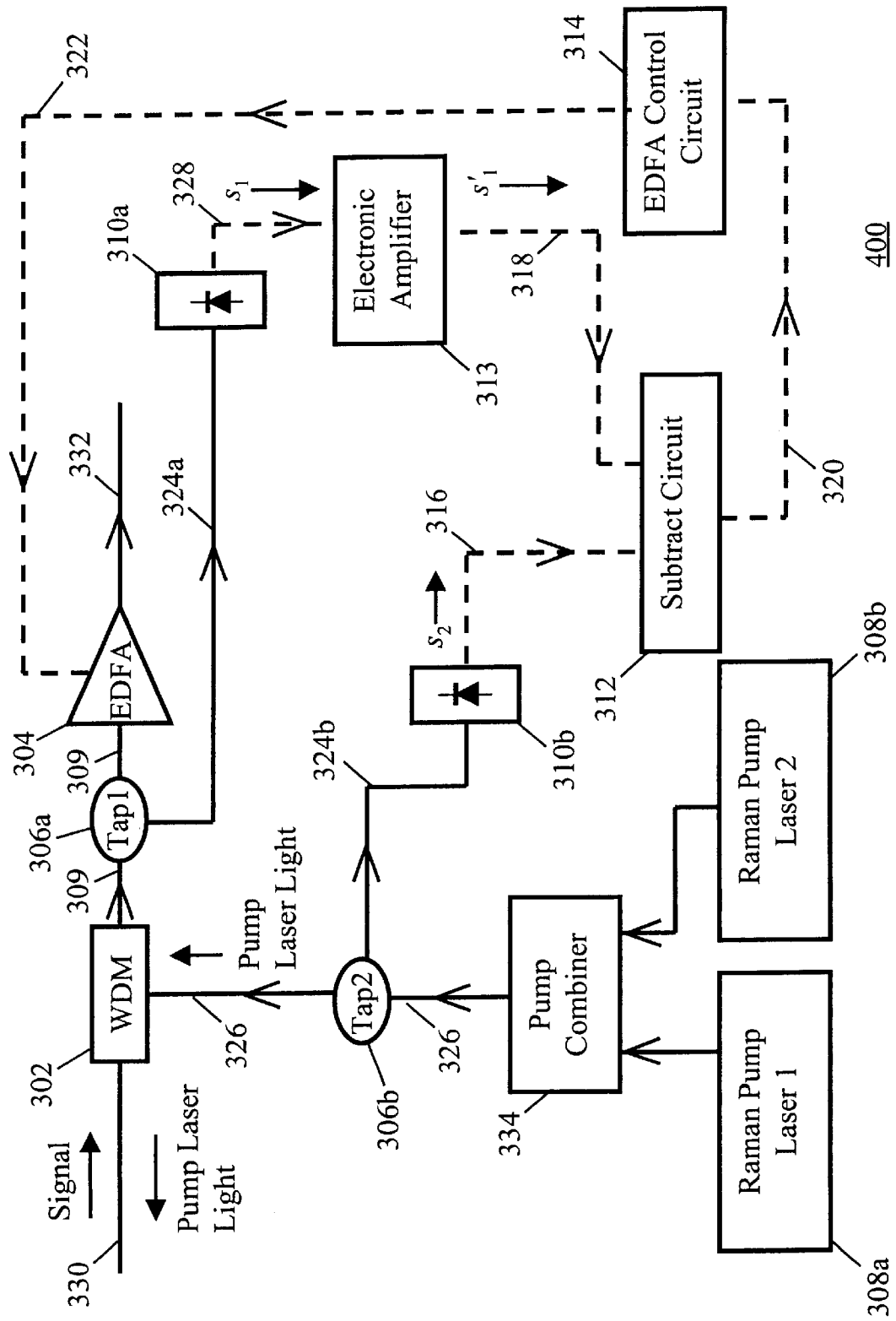
FIG. 4 is a schematic illustration of a second preferred embodiment of an apparatus in accordance with the present invention, comprising an electronic suppression mechanism for eliminating the effects of leaked pump laser signal light from two pump lasers.

A similar design is also applicable for the multiple-pump-laser situation as shown in FIG. 4, which is a schematic illustration of a second preferred embodiment of an apparatus in accordance with the present invention. The apparatus 400 shown in FIG. 4 comprises all the same components as the apparatus 300 (FIG. 3) except that the single Raman pump laser 308 of the apparatus 300 is replaced by a plurality of Raman pump lasers 308a, 308b, etc. and a pump combiner 334 which combines the lights of the plurality of Raman pump lasers into a single output.

An improved apparatus for input channel monitoring or signal monitoring in a hybrid distributed Raman/EDFA optical amplifier and a method for utilizing the apparatus have been disclosed. Although the present invention has been described in accordance with the embodiments shown and discussed, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A hybrid Raman and Erbium-Doped Fiber Optical Amplifier comprising:

an Erbium-Doped Fiber Amplifier (EDFA);

an output fiber optically coupled to an output of the EDFA;

a Wavelength Division Multiplexer (WDM) coupler optically coupled to an input of the EDFA and outputting an optical signal to the EDFA;

an input fiber optically coupled to the WDM for inputting the optical signal to the WDM and for receiving a Raman pump laser light from the WDM;

a first optical tap optically coupled between the EDFA and the WDM;

a first monitor detector optically coupled to the first optical tap;

an electronic amplifier electrically coupled to the first monitor detector;

at least one Raman pump laser optically coupled to the WDM emitting the Raman pump laser light;

a second optical tap optically coupled between the at least one Raman pump laser and the WDM;

a second monitor detector optically coupled to the second optical tap;

an electronic subtract circuit electrically coupled to the second monitor detector and the electronic amplifier; and an EDFA control circuit electrically coupled to the electronic subtract circuit and to the EDFA, wherein the electronic subtract circuit outputs an electronic signal to the EDFA control circuit that is proportional to a power of the optical signal and insensitive to a power of the Raman pump laser light, wherein the EDFA control circuit adjusts an operation of the EDFA based upon the power of the optical signal.

2. The amplifier of claim 1, further comprising an optical combiner optically coupled between the at least one Raman pump laser and the second optical tap.

* * * * *